United States Patent
Fujii et al.

(10) Patent No.: US 10,620,164 B2
(45) Date of Patent: Apr. 14, 2020

(54) DIAGNOSTIC DEVICE AND DIAGNOSTIC METHOD

(71) Applicant: FANUC CORPORATION, Yamanashi (JP)

(72) Inventors: Takaaki Fujii, Yamanashi (JP); Zheng Tong, Yamanashi (JP); Daisuke Uenishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 46 days.

(21) Appl. No.: 16/171,466

(22) Filed: Oct. 26, 2018

(65) Prior Publication Data

US 2019/0128849 A1     May 2, 2019

(30) Foreign Application Priority Data

Oct. 31, 2017   (JP) .................................. 2017-210446

(51) Int. Cl.
*G01N 29/50* (2006.01)
*B23Q 17/12* (2006.01)
(Continued)

(52) U.S. Cl.
CPC ......... *G01N 29/12* (2013.01); *B23Q 17/0976* (2013.01); *B24B 49/00* (2013.01);
(Continued)

(58) Field of Classification Search
CPC .... G05B 19/406; G05B 19/404; B23Q 17/12; H01L 21/02013; H01L 21/02024; G01H 1/003; B24B 49/00
See application file for complete search history.

(56) References Cited

U.S. PATENT DOCUMENTS

| | | | | | |
|---|---|---|---|---|---|
| 4,047,469 A | * | 9/1977 | Sakata | ............... | B23Q 11/0039 409/132 |
| 4,849,741 A | * | 7/1989 | Thomas | ............. | G05B 19/4065 340/683 |

(Continued)

FOREIGN PATENT DOCUMENTS

| | | |
|---|---|---|
| JP | 2006-062081 A | 3/2006 |
| JP | 2012-093983 A | 5/2012 |

(Continued)

OTHER PUBLICATIONS

Decision to Grant a Patent issued by the Japanese Patent Office in relation to Japanese Application No. 2017-210446 dated Nov. 5, 2019 (3 pages) along with English language translation (2 pages).

*Primary Examiner* — Herbert K Roberts
(74) *Attorney, Agent, or Firm* — Robert P. Michal, Esq.; Carter, DeLuca & Farrell LLP (57) ABSTRACT

A diagnostic device includes: a spindle rotational frequency acquisition unit configured to acquire a spindle rotational frequency of a spindle; a pitch acquisition unit configured to acquire a pitch of streaks generated on a surface of a workpiece; a feed rate acquisition unit configured to acquire a feed rate of a tool when mirror surface machining is performed on the surface of the workpiece; a streak frequency calculator configured to calculate a streak frequency that is a cause of the streaks, from the pitch of the streaks and the feed rate of the tool; a causal frequency calculator configured to calculate a causal frequency which causes vibrations of the streak frequency; and a notifying unit configured to indicate whether or not there is a peripheral device that generates vibrations at the causal frequency, around a machine tool.

14 Claims, 4 Drawing Sheets

(51) Int. Cl.
*G01H 1/00* (2006.01)
*G01N 29/12* (2006.01)
*G01H 13/00* (2006.01)
*B23Q 17/09* (2006.01)
*B24B 49/00* (2012.01)
*G01N 29/44* (2006.01)
*G05B 19/404* (2006.01)

(52) U.S. Cl.
CPC ............ *G01H 1/003* (2013.01); *G01H 13/00* (2013.01); *G01N 29/4454* (2013.01); *G01N 29/50* (2013.01); *G05B 19/404* (2013.01)

(56) References Cited

U.S. PATENT DOCUMENTS

| | | | | |
|---|---|---|---|---|
| 5,512,009 | A * | 4/1996 | Earl | B24B 21/00 451/299 |
| 7,156,723 | B2 * | 1/2007 | Natarajan | E01B 31/17 451/347 |
| 2001/0029153 | A1 * | 10/2001 | Mori | B21B 28/04 451/49 |
| 2005/0181706 | A1 * | 8/2005 | Berman | B24B 37/005 451/5 |
| 2005/0208878 | A1 * | 9/2005 | Weiss | B24B 5/37 451/5 |
| 2009/0017734 | A1 * | 1/2009 | Osaki | G05B 19/19 451/242 |
| 2009/0068928 | A1 * | 3/2009 | Kumar | B21B 28/04 451/11 |
| 2010/0311310 | A1 * | 12/2010 | Takeichi | B24B 9/148 451/5 |
| 2013/0103326 | A1 * | 4/2013 | Von Drasek | D21G 9/0045 702/56 |
| 2013/0309034 | A1 * | 11/2013 | Inagaki | B23Q 17/0976 409/132 |
| 2015/0306720 | A1 * | 10/2015 | Ono | B23Q 17/0976 700/174 |
| 2015/0338842 | A1 * | 11/2015 | Ono | G05B 19/404 700/175 |
| 2018/0304429 | A1 * | 10/2018 | Tsuno | B23Q 17/0971 |
| 2019/0291228 | A1 * | 9/2019 | Bandoh | G05B 19/404 |

FOREIGN PATENT DOCUMENTS

| | | |
|---|---|---|
| JP | 2012187691 A | 10/2012 |
| JP | 2013-000850 A | 1/2013 |
| JP | 2015217500 A | 12/2015 |
| JP | 2017013178 A | 1/2017 |
| JP | 2017054463 A | 3/2017 |
| JP | 2017202555 A | 11/2017 |
| JP | 2018163585 A | 10/2018 |

* cited by examiner

DIAGNOSTIC DEVICE AND DIAGNOSTIC METHOD

CROSS-REFERENCE TO RELATED APPLICATION

This application is based upon and claims the benefit of priority from Japanese Patent Application No. 2017-210446 filed on Oct. 31, 2017, the contents of which are incorporated herein by reference.

BACKGROUND OF THE INVENTION

Field of the Invention

The present invention relates to a diagnostic device and a diagnostic method for diagnosing a cause of streaks occurring on a surface of a machined object or workpiece subjected to mirror surface machining by a machine tool.

Description of the Related Art

In recent years, in the field of machining a surface (machined surface) of a workpiece by machine tools, with the development and advance of tools and machine tools, the machined surface has become high-quality so that the machined surface close to mirror surface can be obtained. However, due to vibrations of peripheral devices around the machine tool, there may be a case where streaks occur on the machined surface after a mirror surface machining process.

As a conventional technique for machining an object to be machined by a machine tool, Japanese Laid-Open Patent Publication No. 2013-000850 discloses a technique of suppressing chatter vibrations during machining a workpiece by detecting the frequencies of the chatter vibrations arising during the machining, estimating the natural frequency of the spindle in its rotating state, based on the detected frequencies of chatter vibrations and the rotational frequency of the spindle of the machine tool, and changing the spindle rotational frequency based on the estimated natural frequency.

SUMMARY OF THE INVENTION

However, Japanese Laid-Open Patent Publication No. 2013-000850 does not suggest anything to specify or determine the frequencies of the peripheral devices that cause such streaks.

It is therefore an object of the present invention to provide a diagnostic device and a diagnostic method for indicating or giving notice of the frequencies of peripheral devices which cause streaks to occur on the surface of a workpiece during mirror surface machining in a machine tool.

According to a first aspect of the present invention, a diagnostic device for diagnosing a cause of streaks generated on a surface of a workpiece on which mirror surface machining has been performed by a machine tool by moving a tool attached to a spindle relatively to the workpiece, includes: a spindle rotational frequency acquisition unit configured to acquire a spindle rotational frequency of the spindle; a pitch acquisition unit configured to acquire a pitch of the streaks generated on the surface of the workpiece; a feed rate acquisition unit configured to acquire a feed rate of the tool when the mirror surface machining is performed on the surface of the workpiece; a streak frequency calculator configured to calculate a streak frequency that is a cause of the streaks, from the pitch of the streaks and the feed rate of the tool; a causal frequency calculator configured to calculate a causal frequency which causes vibrations of the streak frequency, from the spindle rotational frequency and the streak frequency; and a notifying unit configured to indicate whether or not there is a peripheral device that generates vibrations at the causal frequency around the machine tool.

According to a second aspect of the present invention, a method of diagnosing a cause of streaks generated on the surface of a workpiece on which mirror surface machining has been performed by a machine tool by moving a tool attached to a spindle relatively to the workpiece, includes: a first step of, by a spindle rotational frequency acquisition unit, acquiring a spindle rotational frequency of the spindle; a second step of, by a pitch acquisition unit, acquiring a pitch of the streaks generated on the surface of the workpiece; a third step of, by a feed rate acquisition unit, acquiring a feed rate of the tool when the mirror surface machining is performed on the surface of the workpiece; a fourth step of, by a streak frequency calculator, calculating a streak frequency that is a cause of the streaks, from the pitch of the streaks and the feed rate of the tool; a fifth step of, by a causal frequency calculator, calculating a causal frequency which causes vibrations of the streak frequency, from the spindle rotational frequency and the streak frequency; and a sixth step of, by a notifying unit, indicating whether or not there is a peripheral device that generates vibrations at the causal frequency around the machine tool.

According to the present invention, it is possible to notify the frequency of a peripheral device which would be the cause of streaks occurring on the surface of the workpiece when the machine tool performs mirror surface machining. As a result, it is possible to take an anti-vibration measure against the peripheral device. As a result, it is possible to precisely perform mirror surface machining while suppressing the occurrence of streaks in mirror surface machining on the surface of the workpiece at the next and subsequent processes.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A diagnostic device and a diagnostic method according to the present invention will be detailed hereinbelow by describing a preferred embodiment with reference to the accompanying drawings.

Configuration of the Present Embodiment
(Explanation of Diagnostic Device 10)

Figure 1:
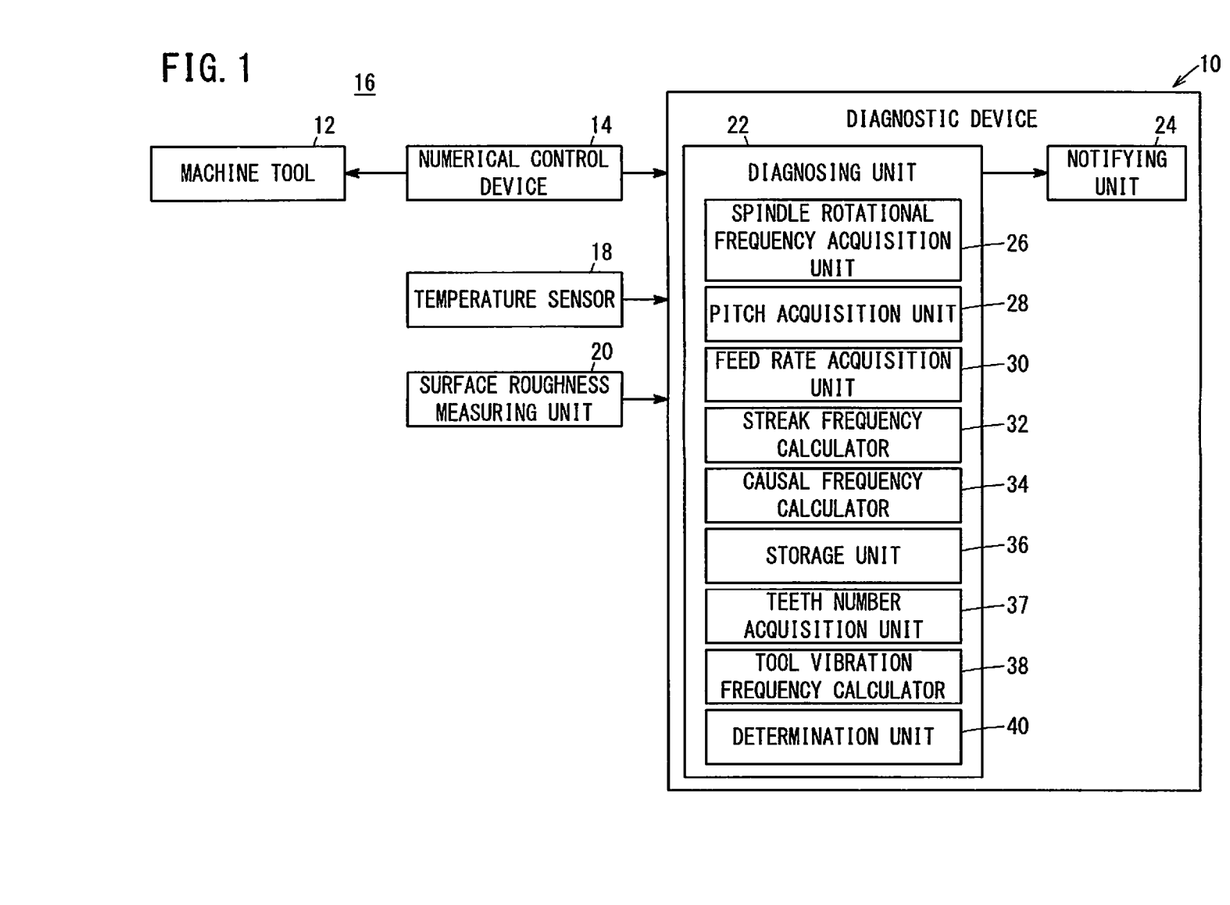
FIG. 1 is a block diagram of a machining system including a diagnostic device of the present embodiment.

As shown in FIG. 1, a diagnostic device 10 of the present embodiment is mounted on a machining system 16 having a machine tool 12 and a numerical control device 14, and identifies (diagnoses) the cause of streaks formed on the surface (machined surface) of a workpiece to be machined by the machine tool 12.

The machining system 16 includes the diagnostic device 10, the machine tool 12, the numerical control device 14, a temperature sensor (spindle temperature measuring unit) 18 and a surface roughness measuring unit 20. The numerical control device 14 controls the machine tool 12 so as to perform a predetermined machining on a workpiece, and supplies to the diagnostic device 10 information on machining conditions of the machine tool 12 for the workpiece such as the feed rate V of the tool, the number of cutting teeth Cn of the tool, the spindle rotational frequency Fm of the spindle, etc. The machine tool 12 includes an unillustrated spindle, a tool attached to the spindle, and the like. The machine tool 12 performs mirror surface machining on the surface (machined surface) of a workpiece by relatively moving the tool and the workpiece.

The temperature sensor 18 measures the temperature Tc of the spindle and outputs a detection signal indicating the measured spindle temperature Tc to the diagnostic device 10. The surface roughness measuring unit 20 measures the surface roughness of the workpiece surface after mirror surface machining and outputs a detection signal indicating the measured surface roughness to the diagnostic device 10. The temperature sensor 18 and the surface roughness measuring unit 20 may be constituent elements of the diagnostic device 10 or may be separate devices from the diagnostic device 10.

The diagnostic device 10 includes a diagnosing unit 22 for diagnosing the cause of streaks generated on a surface of a workpiece, based on various information supplied from the numerical control device 14, the temperature sensor 18 and the surface roughness measuring unit 20, and a notifying unit 24 for indicating or giving notice of the diagnostic result by the diagnosing unit 22 to the outside. The diagnosing unit 22 includes a spindle rotational frequency acquisition unit 26, a pitch acquisition unit 28, a feed rate acquisition unit 30, a streak frequency calculator 32, a causal frequency calculator 34, a storage unit 36, a teeth number acquisition unit 37, a tool vibration frequency calculator 38, and a determination unit 40.

The spindle rotational frequency acquisition unit 26 acquires the spindle rotational frequency Fm of the spindle supplied from the numerical control device 14. The pitch acquisition unit 28 acquires the pitch (interval) D of the streaks occurring on the surface of the workpiece, based on the surface roughness measured by the surface roughness measuring unit 20. The feed rate acquisition unit 30 acquires the feed rate V of the tool in mirror surface machining, supplied from the numerical control device 14.

The streak frequency calculator 32 calculates a streak frequency Fp of streaks based on the pitch D acquired by the pitch acquisition unit 28 and the feed rate V acquired by the feed rate acquisition unit 30. Specifically, the streak frequency calculator 32 calculates the streak frequency Fp using a relational equation of Fp [Hz]=V [mm/sec]/D [mm].

The causal frequency calculator 34 calculates a causal frequency Fc that causes the streak frequency Fp, based on the spindle rotational frequency Fm acquired by the spindle rotational frequency acquisition unit 26 and the streak frequency Fp calculated by the streak frequency calculator 32. The specific calculation process will be described later.

The storage unit 36 stores the natural vibration frequency Fe of the spindle in accordance with the temperature Tc, or the temperature of the spindle. For example, it is possible to measure the natural vibration frequency Fe of the spindle by detecting the acceleration of the spindle when a vibration is applied to the spindle from an unillustrated vibrator, by means of an acceleration sensor (for example, a laser Doppler type acceleration sensor). In this case, at the time of shipping from the factory, the natural vibration frequency Fe of the spindle according to the temperature Tc may be stored in the storage unit 36. Note that the storage unit 36 may also function as a buffer memory for the diagnostic device 10 so as to store other information.

The teeth number acquisition unit 37 acquires the number of cutting teeth Cn of the tool from the numerical control device 14. The tool vibration frequency calculator 38, based on the spindle rotational frequency Fm and the number of cutting teeth Cn of the tool, calculates the tool vibration frequency Ft at which the tool vibrates as the spindle rotates. Specifically, the tool vibration frequency calculator 38 calculates the tool vibration frequency Ft using a relational equation of Ft [Hz]=Fm [Hz]×Cn.

The determination unit 40 acquires from the storage unit 36 the natural vibration frequency Fe corresponding to the spindle temperature Tc detected by the temperature sensor 18, and determines whether or not the absolute value of the difference between the acquired natural vibration frequency Fe and the tool vibration frequency Ft is smaller than or equal to a threshold value TH. In this case, for example, a difference between the natural vibration frequency Fe and a predetermined proportion of the natural vibration frequency Fe (for example, Fe/1.5) may be set as the threshold value TH. In other words, the threshold value TH may depend on the natural vibration frequency Fe.

The notifying unit 24 is a notifying means such as a display, a speaker, a lamp, etc., which directly indicates the diagnosis result from the diagnosing unit 22 to the outside, or an output means which indirectly indicates the diagnosis result to the outside by outputting the diagnosis result to an unillustrated display unit or the like of the numerical control device 14. The diagnosis result notified by the notifying unit 24 includes information for indicating whether or not there is a peripheral device that generates vibration at the causal frequency Fc calculated by the causal frequency calculator 34, around the machine tool 12, and information for indicating that the cause of occurrence of streaks is vibrations of the tool vibration frequency Ft, that is, streaks are caused by the tool vibration, when the determination unit 40 determines that the absolute value is equal to or less than the threshold value TH.

Operation of Embodiment (Explanation of Diagnosis Method)

Figure 2:
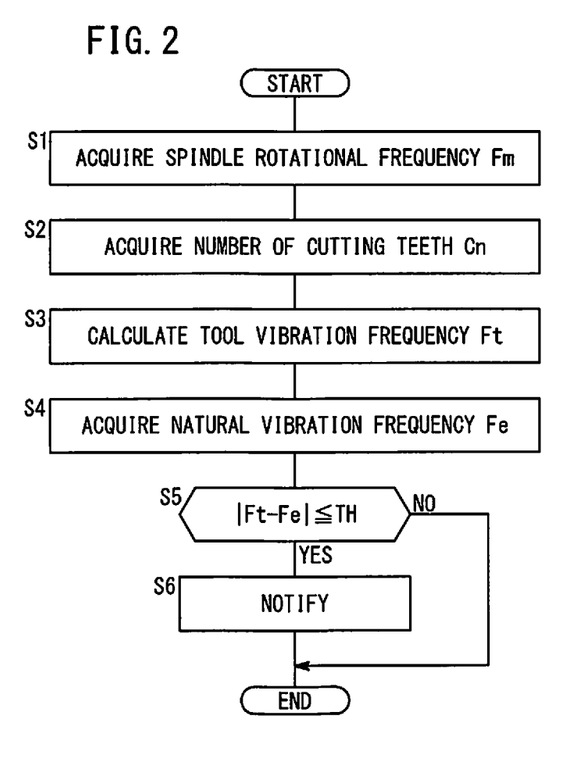
FIG. 2 is a flowchart showing an operation (diagnostic method) of the diagnostic device of FIG. 1 before mirror surface machining.
Figure 3:
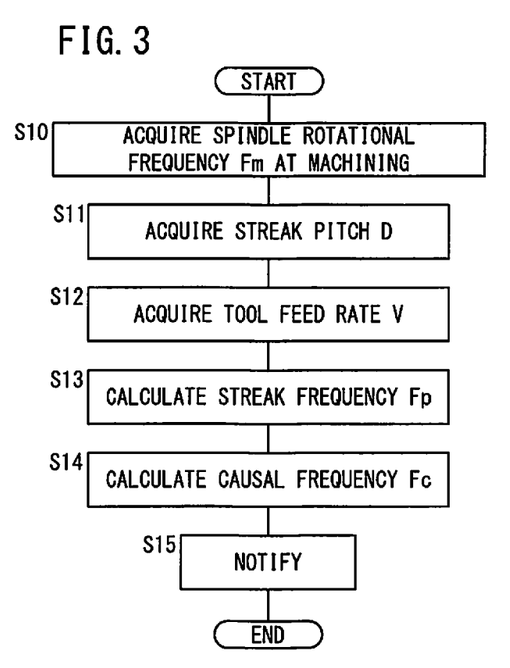
FIG. 3 is a flowchart showing the operation (diagnostic method) of the diagnostic device of FIG. 1 after mirror surface machining.
Figure 4:
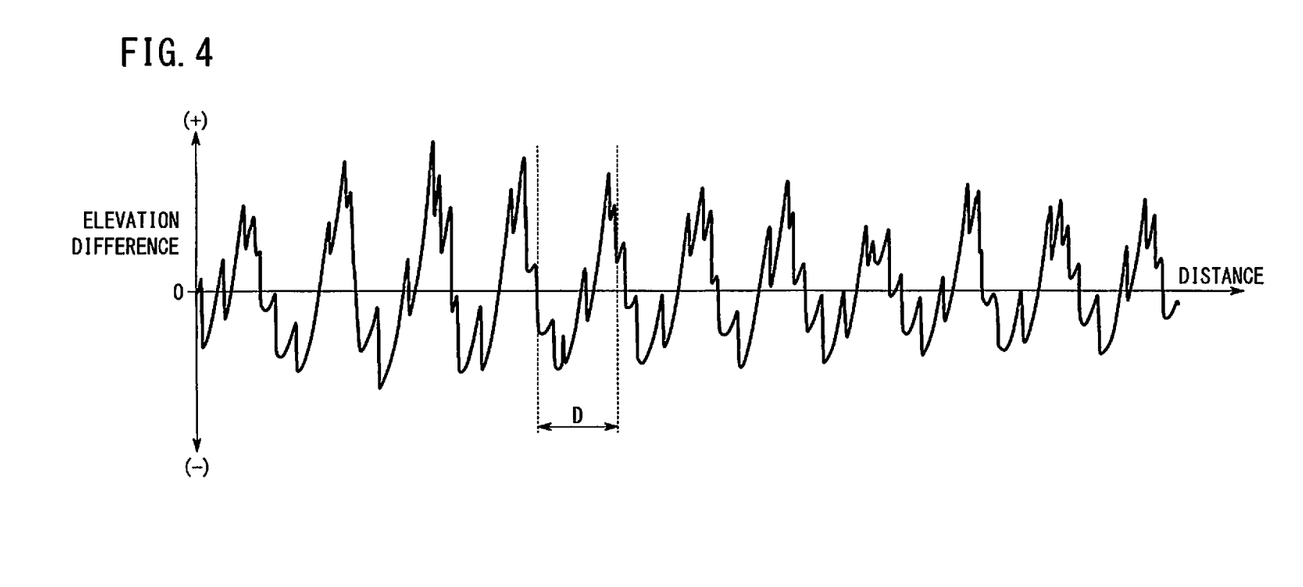
FIG. 4 is a chart showing an example of the measurement result of the surface roughness of the workpiece surface.

Next, the operation (diagnostic method) of the diagnostic device 10 of the present embodiment will be described with reference to FIGS. 2 to 4. Here, a diagnostic process performed prior to mirror surface machining on the surface of a workpiece (see FIG. 2) and a diagnostic process performed after mirror surface machining (see FIG. 3) will be described. The explanation of the operation will be given also with reference to FIG. 1 as necessary.

First, the diagnostic process before mirror surface machining will be explained with reference to FIG. 2. At step S1, the spindle rotational frequency acquisition unit 26 (see FIG. 1) acquires the spindle rotational frequency Fm. In the description of FIG. 2, the spindle rotational frequency Fm is assumed to be 200 [Hz].

Next, at step S2 the teeth number acquisition unit 37 acquires the number of cutting teeth Cn of the tool. In the explanation of FIG. 2, the number of cutting teeth Cn is assumed to be 2.

Next, at step S3 the tool vibration frequency calculator 38 calculates the tool vibration frequency Ft of the tool associated with rotation of the spindle, based on the spindle rotational frequency Fm acquired at step S1 and the number of cutting teeth Cn of the tool acquired at step S2. In the explanation of FIG. 2, since Fm=200 [Hz] and Cn=2, the tool vibration frequency Ft is 400 [Hz] (=200 [Hz]×2).

Next, at step S4 the determination unit 40 acquires the natural vibration frequency Fe corresponding to the spindle temperature Tc detected by the temperature sensor 18 from the storage unit 36. In the explanation of FIG. 2, the natural vibration frequency Fe is assumed to be 500 [Hz].

Next, at step S5 the determination unit 40 determines whether or not |Ft−Fe|, i.e., the absolute value of the difference between the tool vibration frequency Ft calculated at step S3 and the natural vibration frequency Fe acquired at step S4, is equal to or less than the threshold value TH. In the explanation of FIG. 2, since the threshold value TH is assumed so that TH=Fe−Fe/1.5, the threshold value TH is about 166.67 [Hz] (=500−500/1.5).

At step S5, when determining that the absolute value of the difference (|Ft−Fe|) is equal to or smaller than the threshold value TH (step S5: YES), the determination unit 40 determines that the current condition will cause abnormality, and the control proceeds to the next step S6. On the other hand, if it is determined at step S5 that the absolute value of the difference (|Ft−Fe|) is not equal to or not less than the threshold value TH, that is, if the absolute value is greater than the threshold value TH, the determination unit 40 determines that the current condition is normal, and then the present operation is brought to an end.

At step S6 the notifying unit 24 notifies the operator that streaks are caused on account of the tool vibration frequency Ft. As receiving this information, the operator can recognize that the tool vibration frequency Ft is the cause of streaks, and can change the tool vibration frequency Ft by changing at least one of the spindle rotational frequency Fm and the number of cutting teeth Cn.

Next, the diagnostic process after mirror surface machining will be described with reference to FIG. 3. At step S10 (first step), the spindle rotational frequency acquisition unit 26 acquires the spindle rotational frequency Fm during mirror surface machining. In the description of FIG. 3, the spindle rotational frequency Fm is assumed to be 200 [Hz].

Next, at step S11 (second step) the pitch acquisition unit 28 acquires the pitch D of streaks occurring on the workpiece surface, based on the surface roughness measured by the surface roughness measuring unit 20. In the explanation of FIG. 3, the pitch D of streaks is assumed to be 0.2 [mm]. FIG. 4 shows an example of the measurement result of the surface roughness measured by the surface roughness measuring unit 20. In FIG. 4, the horizontal axis represents the distance along the surface of the workpiece, and the vertical axis represents the difference in elevation of the surface relative to a reference value (0). Further, the pitch acquisition unit 28 can calculate the pitch D of streaks, based on a surface roughness parameter from among the measurements by the surface roughness measuring unit 20, for example, the mean width of the roughness profile elements Rsm, the mean width of the primary profile elements Psm, or the mean width of the waviness profile elements Wsm.

Next, at step S12 (third step), the feed rate acquisition unit 30 acquires the feed rate V of the tool in mirror surface machining. In the description of FIG. 3, the feed rate V is set to 8 [mm/sec].

Next, at step S13 (fourth step), the streak frequency calculator 32 uses the pitch D acquired by the pitch acquisition unit 28 at step S11 and the feed rate V acquired by the feed rate acquisition unit 30 at step S12 to calculate the streak frequency Fp which causes streaks. In the explanation of FIG. 3, since D=0.2 [mm] and V=8 [mm/sec], the streak frequency Fp is 40 [Hz] (=8 [mm/sec]/0.2 [mm]).

Subsequently, at step S14 (fifth step), the causal frequency calculator 34 uses the spindle rotational frequency Fm acquired by the spindle rotational frequency acquisition unit 26 at step S10 and the streak frequency Fp calculated by the streak frequency calculator 32 at step S13 to calculate the causal frequency Fc which is the cause of generation of the streak frequency Fp.

In this case, the causal frequency calculator 34 calculates two causal frequencies Fc, one obtained by adding the streak frequency Fp to the spindle rotational frequency Fm and the other obtained by subtracting the streak frequency Fp from the spindle rotational frequency Fm.

Specifically, the causal frequencies Fc are calculated according to the relational equations Fc=Fm+Fp and Fc=Fm−Fp. In the explanation of FIG. 3, since Fm=200 [Hz] and Fp=40 [Hz], the causal frequencies Fc are 240 [Hz] (=200+40) and 160 [Hz] (=200−40).

Alternatively, the causal frequency calculator 34 calculates causal frequencies Fc, by adding N times or 1/N times the streak frequency Fp to the spindle rotational frequency Fm and by subtracting N times or 1/N times the streak frequency Fp from the spindle rotational frequency Fm. Here, N is an integer greater than or equal to 2. More specifically, the causal frequencies Fc are calculated from the relational equations Fc=Fm+N×Fp and Fc=Fm−N×Fp, or from relational equations of Fc=Fm+(1/N)×Fp and Fc=Fm−(1/N)×Fp.

Subsequently, at step S15 (sixth step), the notifying unit 24 notifies the operator of a diagnosis result including the causal frequencies Fc (240 [Hz] and 160 [Hz]), that is, the notifying unit 24 asks the operator whether there is a peripheral device that generates vibrations at the causal frequencies Fc, on the periphery of the machine tool 12. As a result, based on the notified diagnosis result, the operator checks whether or not there exists a peripheral device that generates vibrations at the causal frequencies Fc in the surroundings of the machine tool 12, and if such a peripheral device is found, the operator can take an appropriate action on the device to suppress the vibrations. Accordingly, it is possible to perform mirror surface machining more accurately at the next and subsequent processes while suppressing the occurrence of streaks.

Technical Concepts Obtained from the Embodiment

Technical concepts that can be grasped from the above embodiment will be described below.

The diagnostic device (10) for diagnosing a cause of streaks generated on the surface of a workpiece on which mirror surface machining has been performed by the machine tool (12) by moving the tool attached to the spindle relatively to the workpiece, includes: the spindle rotational frequency acquisition unit (26) configured to acquire the spindle rotational frequency (Fm) of the spindle; the pitch acquisition unit (28) configured to acquire the pitch (D) of the streaks generated on the surface of the workpiece; the feed rate acquisition unit (30) configured to acquire the feed speed (V) of the tool when the mirror surface machining is performed on the surface of the workpiece; the streak frequency calculator (32) configured to calculate the streak frequency (Fp) that is a cause of the streaks, from the pitch (D) of the streaks and the feed rate (V) of the tool; the causal frequency calculator (34) configured to calculate the causal frequency (Fc) which causes vibrations of the streak frequency (Fp), from the spindle rotational frequency (Fm) and the streak frequency (Fp); and the notifying unit (24) configured to indicate whether or not there is a peripheral device that generates vibrations at the causal frequency (Fc) around the machine tool (12).

Owing to the above configuration, it is possible to notify the operator of the frequency of a peripheral device which would be the cause of streaks occurring on the surface of the workpiece when the machine tool (12) performs mirror surface machining. As a result, it is possible to take an anti-vibration measure against the peripheral device, hence precisely perform mirror surface machining while suppressing the occurrence of streaks in mirror surface machining on the surface of the workpiece at the next and subsequent processes.

The causal frequency calculator (34) may calculate the causal frequencies (Fc) by adding the streak frequency (Fp) to the spindle rotational frequency (Fm) and by subtracting the streak frequency (Fp) from the spindle rotational frequency (Fm). This makes it possible to accurately give notice of the cause of occurrence of streaks.

The causal frequency calculator (34) may calculate the causal frequencies (Fc) by adding N times or 1/N times the streak frequency (Fp) to the spindle rotational frequency (Fm) and by subtracting N times or 1/N times the streak frequency (Fp) from the spindle rotational frequency (Fm). Also in this case, it is possible to accurately notify the operator of the cause of occurrence of streaks.

The diagnostic device (10) may further include: the storage unit (36) configured to store the natural vibration frequency (Fe) of the spindle; the tool vibration frequency calculator (38) configured to calculate the tool vibration frequency (Ft) of the tool associated with rotation of the spindle, from the spindle rotational frequency (Fm) and the number of cutting teeth (Cn) of the tool; and the determination unit (40) configured to determine whether or not the absolute value (|Ft−Fe|) of the difference between the natural vibration frequency (Fe) and the tool vibration frequency (Ft) is equal to or smaller than a threshold value (TH), and the notifying unit (24) may indicate that the streaks are caused due to vibration of the tool vibration frequency (Ft) in a case that the determination unit (40) determines that the absolute value (|Ft−Fe|) is equal to or smaller than the threshold value (TH). With this configuration, it is possible to notify the operator that there is a risk of streaks occurring due to vibration of the tool before mirror surface machining is performed on the surface of the workpiece. As a result, by changing the machining conditions of mirror surface machining or the like, it is possible to perform mirror surface machining while suppressing occurrence of streaks.

The diagnostic device (10) may further include the spindle temperature measuring unit (18) configured to measure the spindle temperature (Tc), and the storage unit (36) may store the natural vibration frequency (Fe) in accordance with the spindle temperature (Tc), and the determination unit (40) may determine whether the absolute value (|Ft−Fe|) of the difference between the natural vibration frequency (Fe) corresponding to the spindle temperature (Tc) and the tool vibration frequency (Ft) is equal to or smaller than the threshold value (TH). As a result, it is possible to accurately determine whether there is a risk that streaks may occur due to the tool vibration, while considering the spindle temperature (Tc).

The pitch acquisition unit (28) may acquire the pitch (D) of the streaks from the surface roughness of the workpiece surface, measured by the surface roughness measuring unit (20). Thereby, it is possible to accurately identify the cause of generation of streaks.

The pitch acquisition unit (28) may calculate the pitch (D) of the streaks, based on a surface roughness parameter as the measurement result of the surface roughness measuring unit (20). Also in this case, it is possible to accurately identify the cause of generation of streaks.

A method of diagnosing a cause of streaks generated on the surface of a workpiece on which mirror surface machining has been performed by the machine tool (12) by moving the tool attached to the spindle relatively to the workpiece includes: a first step (step S10) of, by the spindle rotational frequency acquisition unit (26), acquiring the spindle rotational frequency (Fm) of the spindle; a second step (step S11) of, by the pitch acquisition unit (28), acquiring the pitch (D) of the streaks generated on the surface of the workpiece; a third step (step S12) of, by the feed rate acquisition unit (30), acquiring the feed rate (V) of the tool when the mirror surface machining is performed on the surface of the workpiece; a fourth step (step S13) of, by the streak frequency calculator (32), calculating the streak frequency (Fp) that is a cause of the streaks, from the pitch (D) of the streaks and the feed rate (V) of the tool; a fifth step (step S14) of, by the causal frequency calculator (34), calculating the causal frequency (Fc) which causes vibrations of the streak frequency (Fp), from the spindle rotational frequency (Fm) and the streak frequency (Fp); and a sixth step (step S15) of, by the notifying unit (24), indicating whether or not there is a peripheral device that generates vibrations at the causal frequency (Fc) around the machine tool (12).

Also in this case, it is possible to notify the operator of the frequency of a peripheral device which would be the cause of streaks occurring on the surface of the workpiece when the machine tool (12) performs mirror surface machining. As a result, it is possible to take an anti-vibration measure against the peripheral device, hence precisely perform mirror surface machining while suppressing the occurrence of streaks in mirror surface machining on the surface of the workpiece at the next and subsequent processes.

The present invention is not particularly limited to the embodiments described above, and various modifications are possible without departing from the essence and gist of the present invention.

What is claimed is:

1. A diagnostic device for diagnosing a cause of streaks generated on a surface of a workpiece on which mirror surface machining has been performed by a machine tool by moving a tool attached to a spindle relatively to the workpiece, the diagnostic device comprising:

a spindle rotational frequency acquisition unit configured to acquire a spindle rotational frequency of the spindle;

a pitch acquisition unit configured to acquire a pitch of the streaks generated on the surface of the workpiece;

a feed rate acquisition unit configured to acquire a feed rate of the tool when the mirror surface machining is performed on the surface of the workpiece;

a streak frequency calculator configured to calculate a streak frequency that is a cause of the streaks, from the pitch of the streaks and the feed rate of the tool;

a causal frequency calculator configured to calculate a causal frequency which causes vibrations of the streak frequency, from the spindle rotational frequency and the streak frequency; and a notifying unit configured to indicating whether or not there is a peripheral device that generates vibrations at the causal frequency around the machine tool.

2. The diagnostic device according to claim 1, wherein the causal frequency calculator is configured to calculate the causal frequencies by adding the streak frequency to the spindle rotational frequency and by subtracting the streak frequency from the spindle rotational frequency.

3. The diagnostic device according to claim 2, wherein the causal frequency calculator is configured to calculate the causal frequencies by adding N times or 1/N times the streak frequency to the spindle rotational frequency and by subtracting N times or 1/N times the streak frequency from the spindle rotational frequency, where N is an integer greater than or equal to 2.

4. The diagnostic device according to claim 1, further comprising:

a storage unit configured to store a natural vibration frequency of the spindle;

a tool vibration frequency calculator configured to calculate a tool vibration frequency of the tool associated with rotation of the spindle, from the spindle rotational frequency and a number of cutting teeth of the tool; and a determination unit configured to determine whether or not an absolute value of difference between the natural vibration frequency and the tool vibration frequency is equal to or smaller than a threshold value, wherein the notifying unit is configured to indicate that the streaks are caused due to vibration of the tool vibration frequency in a case that the determination unit determines that the absolute value is equal to or smaller than the threshold value.

5. The diagnostic device according to claim 4, further comprising a spindle temperature measuring unit configured to measure a temperature of the spindle, wherein:

the storage unit is configured to store the natural vibration frequency in accordance with the temperature of the spindle; and the determination unit is configured to determine whether the absolute value of the difference between the natural vibration frequency corresponding to the temperature of the spindle and the tool vibration frequency is equal to or smaller than the threshold value.

6. The diagnostic device according to claim 1, wherein the pitch acquisition unit is configured to acquire the pitch of the streaks from surface roughness of the surface of the workpiece, measured by a surface roughness measuring unit.

7. The diagnostic device according to claim 6, wherein the pitch acquisition unit is configured to calculate the pitch of the streaks, based on a surface roughness parameter as measurement result of the surface roughness measuring unit.

8. A method of diagnosing a cause of streaks generated on a surface of a workpiece on which mirror surface machining has been performed by a machine tool by moving a tool attached to a spindle relatively to the workpiece, the method comprising:

a first step of, by a spindle rotational frequency acquisition unit, acquiring a spindle rotational frequency of the spindle;

a second step of, by a pitch acquisition unit, acquiring a pitch of the streaks generated on the surface of the workpiece;

a third step of, by a feed rate acquisition unit, acquiring a feed rate of the tool when the mirror surface machining is performed on the surface of the workpiece;

a fourth step of, by a streak frequency calculator, calculating a streak frequency that is a cause of the streaks, from the pitch of the streaks and the feed rate of the tool;

a fifth step of, by a causal frequency calculator, calculating a causal frequency which causes vibrations of the streak frequency, from the spindle rotational frequency and the streak frequency; and a sixth step of, by a notifying unit, indicating whether or not there is a peripheral device that generates vibrations at the causal frequency around the machine tool.

9. The diagnostic method according to claim 8, wherein the causal frequency calculator calculates the causal frequencies by adding the streak frequency to the spindle rotational frequency and by subtracting the streak frequency from the spindle rotational frequency.

10. The diagnostic method according to claim 9, wherein the causal frequency calculator calculates the causal frequencies by adding N times or 1/N times the streak frequency to the spindle rotational frequency and by subtracting N times or 1/N times the streak frequency from the spindle rotational frequency, where N is an integer greater than or equal to 2.

11. The diagnostic method according to claim 8, further comprising the steps of:

storing a natural vibration frequency of the spindle in a storage unit;

calculating a tool vibration frequency of the tool associated with rotation of the spindle, from the spindle rotational frequency and a number of cutting teeth of the tool, by a tool vibration frequency calculator; and determining whether or not an absolute value of difference between the natural vibration frequency and the tool vibration frequency is equal to or smaller than a threshold value, by a determination unit, wherein the notifying unit indicates that the streaks are caused due to vibration of the tool vibration frequency in a case that the determination unit determines that the absolute value is equal to or smaller than the threshold value.

12. The diagnostic method according to claim 11, wherein:

the storage unit stores the natural vibration frequency in accordance with a temperature of the spindle measured by a spindle temperature measuring unit; and the determination unit determines whether the absolute value of the difference between the natural vibration frequency corresponding to the temperature of the spindle and the tool vibration frequency is equal to or smaller than the threshold value.

13. The diagnostic method according to claim 8, wherein the pitch acquisition unit acquires the pitch of the streaks from surface roughness of the surface of the workpiece, measured by a surface roughness measuring unit.

14. The diagnostic method according to claim 13, wherein the pitch acquisition unit calculates the pitch of the streaks, based on a surface roughness parameter as measurement result of the surface roughness measuring unit.

* * * * *